(12) United States Patent
Laufer et al.

(10) Patent No.: US 7,280,124 B2
(45) Date of Patent: Oct. 9, 2007

(54) VEHICLE WITH IMAGE PROCESSING SYSTEM AND METHOD FOR OPERATING AN IMAGE PROCESSING SYSTEM

(75) Inventors: Martin Laufer, Hasloch (DE); Tim Weis, Mainaschaff (DE)

(73) Assignee: Magna Donnelly GmbH & Co. KG (DE)

( * ) Notice: Subject to any disclaimer, the term of this patent is extended or adjusted under 35 U.S.C. 154(b) by 0 days.

(21) Appl. No.: 11/194,433

(22) Filed: Aug. 1, 2005

(65) Prior Publication Data

US 2006/0033755 A1 Feb. 16, 2006

(30) Foreign Application Priority Data

Aug. 11, 2004 (DE) ........................ 10 2004 039 108
Apr. 21, 2005 (DE) ........................ 10 2005 018 710

(51) Int. Cl.
*G09G 5/00* (2006.01)
*G06K 9/36* (2006.01)
(52) U.S. Cl. ...................................... 345/629; 382/284
(58) Field of Classification Search ................ 345/629; 382/284
See application file for complete search history.

(56) References Cited

U.S. PATENT DOCUMENTS

| | | | | |
|---|---|---|---|---|
| 5,410,346 A * | 4/1995 | Saneyoshi et al. | ........... | 348/116 |
| 5,530,421 A * | 6/1996 | Marshall et al. | ............ | 340/436 |
| 6,558,049 B1 | 5/2003 | Shin | | |
| 6,567,096 B1 * | 5/2003 | Oka et al. | ................... | 345/592 |
| 6,611,202 B2 * | 8/2003 | Schofield et al. | ........... | 340/461 |
| 6,693,524 B1 * | 2/2004 | Payne | ........................ | 340/463 |
| 6,891,563 B2 * | 5/2005 | Schofield et al. | ........... | 348/148 |
| 2002/0126226 A1 | 9/2002 | Dudkowski | | |
| 2003/0206180 A1 | 11/2003 | Ehlers et al. | | |

\* cited by examiner

*Primary Examiner*—Kee M. Tung
*Assistant Examiner*—Motilewa Good-Johnson
(74) *Attorney, Agent, or Firm*—McGlew and Tuttle P.C.

(57) ABSTRACT

A vehicle (01) has at least two image data sources (02), at least one mixing unit (03), at least one conversion unit (04) and an image display unit (05). The pixel data (09) generated with the image data sources (02) can be brought together by means of the mixing unit (03) in particular for simultaneous display on the image display unit (05). With the conversion unit (04), the pixel data (10) can be transformed to a form of image data (11) which can be displayed on the image display unit (05). The mixing unit (03) includes at least two data input ports (06) for receiving pixel data (09) from the two image data sources (02), and at least one data output port (07) for the brought-together pixel data (10). The conversion unit (04) includes at least one data input port (08) for the brought-together pixel data (10). The data output port (07) of the mixing unit (03) is directly or indirectly connected to the data input port (08) of the conversion unit (04). A method for operating an image processing system in a vehicle (01) is provided in which first the pixel data (09) of the various image data sources (02) is brought together by means of the mixing unit (03), and thereafter, by means of the conversion unit (04), the brought-together pixel data (10) is transformed into a form of image data (11).

16 Claims, 6 Drawing Sheets

VEHICLE WITH IMAGE PROCESSING SYSTEM AND METHOD FOR OPERATING AN IMAGE PROCESSING SYSTEM

CROSS REFERENCE TO RELATED APPLICATIONS

This application claims the benefit of priority under 35 U.S.C. § 119 of German Patent Application DE 10 2004 039 108.4 filed Aug. 11, 2004 and German Patent Application DE 10 2005 018 710.2 filed Apr. 21, 2005, the entire contents of each application is incorporated herein by reference.

FIELD OF THE INVENTION

The present invention relates to a vehicle with at least two image data sources, a mixing unit, a conversion unit and an image display unit, wherein the pixel data generated with the image data sources can be brought together by means of the mixing unit and the pixel data can be transformed by the conversion unit to a form of image data which can be displayed on the image display unit and the present invention relates a method for operating an image processing system in a vehicle.

BACKGROUND OF THE INVENTION

In generic vehicles, such image processing systems are used for various applications in which several cameras are employed simultaneously. Such applications can for example include side-view, lane detection, parking camera and interior camera for monitoring by the driver. Moreover, it can be sensible to simultaneously present, on the image display unit, the information from several cameras.

The image data sources of these image processing systems are often designed in the form of CCD chips and/or CMOS chips. Fundamentally, the light-sensitive cells of these chips only acquire color-independent brightness values. In order to obtain color information a color filter in one of the primary colors of the respective color system, for example in red, green or blue, is placed in front of each individual cell. In such an arrangement, the filters are for example affixed to the cells in an arrangement which is referred to as a "Bayer pattern". In this arrangement, the first line of the light-sensitive cells comprises filters in the order of red, green, red, green etc.; the second line comprises filters alternately colored green, blue, green, blue etc.; and the third line again comprises filters alternately colored red, green, red, green etc. As a result of these filters being in place, each of the cells only measures the brightness of the individual color components and conveys said brightness as pixel data.

At first, this pixel data cannot be displayed on the image display unit. The adjacent cells have to be used in order to detect the true color. This color interpolation is undertaken by means of a conversion unit. As a result, the conversion unit provides image data which can be presented on the image display unit.

In order to achieve simultaneous display of the information from several image data sources, it is necessary to bring the image data from several image data sources together. Such bringing together takes place by means of a mixing unit. In the state of the art, conversion of the pixel data to image data is always carried out first, followed by the bringing together of the image data for simultaneous display on the image display unit.

This embodiment has a disadvantage in that in each case the pixel data of the image data sources first has to be transformed to image data, wherein such transformation is carried out in a conversion unit. This necessitates many of these conversion units, which results in very considerable expense.

This embodiment is associated with a further disadvantage in that during color interpolation even those image regions are calculated which for example as a result of overlay of additional information on the image display unit, or as a result of overlap in the image sections of different image data sources, will never be displayed on the image display unit. This type of image processing unnecessarily uses resources in the time intensive interpolation process, and/or slows down the interpolation process.

SUMMARY OF THE INVENTION

It is thus the object of the present invention to provide a new vehicle with an image processing system, and a new method for operating an image processing system.

According to the invention, this problem is solved in that the mixing unit comprises at least two data input ports for receiving pixel data from the two image data sources, and at least one data output port for the brought together pixel data, wherein the conversion unit comprises at least one data input port for the brought-together pixel data, and wherein the data output port of the mixing unit is directly or indirectly connected to the data input port of the conversion unit.

The pixel data generated by the various image data sources is conveyed to a data input port of the mixing unit. By means of the mixing unit, the pixel data is brought together in such a manner that at the data output port of the mixing unit exactly that pixel data exits as brought-together pixel data, which pixel data is necessary for displaying the desired image and/or the desired image section and/or the desired combination of image information of various image data sources. The brought-together pixel data is conveyed to the data input port of the conversion unit. By means of the conversion unit, the conversion of the brought-together pixel data to form image data which can be displayed on the image display unit is completed.

As a result of the above, the image processing system according to the invention needs only one conversion unit. The image processing system according to the invention is associated with a further advantage in that the quantity of pixel data which is output at the data output port of the mixing unit as brought-together pixel data is precisely definable by means of the mixing unit. This definition depends on the respective application which is to be implemented with the image processing system. Thus, after this, only those processing steps and/or calculations are carried out in the data processing chain, which processing steps or calculations are still required in the further course of data processing. This reduction in the pixel data, by means of the mixing unit, to a relevant partial quantity is of special advantage in particular to the conversion unit as regards the time-intensive interpolation process.

Basically, the design of the image data sources is of no importance. However, it is advantageous if the image data sources comprise at least one CCD unit and/or one CMOS unit. Such a design is particularly cost effective.

Basically, the design of the mixing unit can be freely selected. However, it is advantageous if the mixing unit comprises at least one data input port for receiving pixel data for each image data source. Furthermore, the mixing unit comprises a data output port for the pixel data that has been brought together.

In a further embodiment the mixing unit comprises at least one data input port, wherein the pixel data generated with the image data sources can directly or indirectly be forwarded to this one data input port of the mixing unit. With digital addressing of the pixel data, this embodiment provides particular advantages concerning a compact construction of the mixing unit.

Integrated circuits are particularly suitable for implementing the mixing unit. In particular a pre-programmed and/or freely programmable integrated circuit, for example a DSP and/or an FPGA and/or an ASIC, might be used. While the purchase price of freely programmable components is somewhat more expensive, such components do however make it possible to carry out additional processing and/or evaluation, for example directly when the pixel data is brought together.

According to the invention, the conversion unit comprises at least one data input port for the pixel data already brought together. Furthermore it is advantageous if the conversion unit comprises a data output port which makes available the converted image data, which can be displayed on the image display unit.

The design of the conversion unit is also basically of no importance. However, it is particularly advantageous if the conversion unit is implemented in the form of an integrated circuit. In particular, preprogrammed and/or freely programmable integrated circuits, such as for example a DSP and/or an FPGA and/or an ASIC, are suitable for this.

According to the invention, the circuit arrangement of the individual elements of the image processing system is such that the data output port of the mixing unit is directly or indirectly connected to the data input port of the conversion unit. In this arrangement, the pixel data already brought together by the mixing unit is conveyed to the conversion unit directly or indirectly. In the conversion unit, the pixel data is transformed into a form of image data which can be displayed on the image display unit, with said data then being conveyed, by way of the output port of the conversion unit, to a further arithmetic unit and/or to an image display unit.

This design provides special advantages in that the entire image processing system requires only one conversion unit. This not only saves the considerable expenditure that would have been incurred in the procurement of several conversion units, but also saves having to process, in parts of the image processing system, data which for the above-mentioned reasons does not get displayed at all.

In a further embodiment, the image processing system comprises at least a third arithmetic unit of the data processing chain, wherein additional processing and/or evaluation of the pixel data and/or image data can be carried out by means of the third arithmetic unit. This third arithmetic unit can for example be arranged at any desired location in the data processing chain, for example in the form of a dedicated integrated circuit.

Integration of the third arithmetic unit in the mixing unit and/or in the conversion unit would also be imaginable. Such integration is particularly easy to implement if the mixing unit and/or the conversion unit is a programmable integrated circuit.

Particularly efficient and fast data processing is possible if several third arithmetic units, in particular arithmetic units of identical design, are provided in the data processing chain. In these different arithmetic units, individual functions can be carried out in parallel independently of one another. Thus it is conceivable for example that the image data is synchronously provided to all third arithmetic units, wherein one arithmetic unit calculates the image data for image display, while another arithmetic unit simultaneously carries out the function of object recognition, in particular the function of road sign recognition.

Here some applications are associated with the advantage that the various third arithmetic units can exchange data via data lines, in order to exchange the individual image processing results.

All these embodiments make possible a particularly variable design of the image processing system. By using various units it is possible to optimize the performance of the image processing system. Since the performance of the units correlates with their procurement costs, the expenditure incurred for the image processing system can be optimized in this way.

In principle, the embodiment of the image display unit is of no importance. Due to the small dimensions, a design of the image display unit in the form of a flat-panel monitor and/or a display is particularly suitable. In this arrangement the flat-panel monitor and/or the display arelis arranged in or near the driver's field of vision. The image display unit can also be designed in the form of a projector device. This embodiment provides a particular advantage in that, by way of projection to the inside of the windscreen, display of information directly in the driver's field of vision becomes possible.

The method according to the invention, for operating an image processing system in a vehicle, comprising at least two image data sources, in particular CCD units and/or CMOS units, at least one mixing unit, at least one conversion unit and an image display unit, comprises at least two processing steps.

First the pixel data of the various image data sources is brought together by means of the mixing unit, and then, by means of the conversion unit, the brought-together pixel data is transformed into a form of image data.

In the first-mentioned method-related step the bringing-together of the pixel data of the various image data sources is carried out, which data has been conveyed to the mixing unit directly or indirectly.

In principle, the way the data is brought together is of no consequence. However, it is particularly advantageous if the bringing-together takes place in such a way that only that pixel data exits as brought-together pixel data from the mixing unit, which pixel data is to be displayed on the image display unit. In this way, for example overlapping areas in the image, in the case of panoramic views or in the case of overlays (pop-up or pull-down), are prevented, and the overall quantity of the pixel data generated by the various image data sources is reduced by means of the mixing unit to that part which is to be displayed on the image display unit. In this way, the time used for calculation and processing in subsequent processing steps is optimized.

In the second process-related step the transformation of brought-together pixel data into a form of image data which can be displayed on the image display unit is carried out by means of the conversion unit.

In principle, the way the data is transformed is unimportant. A known way of transforming pixel data into a form of image data is based on averaging by way of adjacent pixel data, in particular on interpolation Bringing-together as the first method-related step, and transformation as the second method-related step are basically only the minimum configuration of the method. However, additional processing steps and/or evaluation steps are imaginable with this method.

Pixel data of the various image data sources could be subjected to additional processing steps and/or evaluation steps before it reaches the mixing unit, and/or the pixel data which has already been brought together by means of the mixing unit might be subjected to additional processing steps and/or evaluation steps before it reaches the conversion unit, and/or the image data already transformed by means of the conversion unit might be subjected to additional processing steps and/or evaluation steps.

These additional processing steps and/or evaluation steps could for example be implemented by means of a third arithmetic unit. The performance of this third arithmetic unit could be optimally adapted to the requirements of the processing steps and/or the evaluation steps. This supports scalability of the entire image processing system.

In a further embodiment, implementation of the additional processing steps and/or evaluation steps by means of the mixing unit and/or by means of the conversion unit is imaginable. This embodiment is in particular favorable where the pixel data is brought together to form a panoramic view. In this arrangement, by way of additional processing steps and/or evaluation steps, for example directly during the bringing together of the pixel data in the mixing unit, various image data sources are brought together to form a panoramic view, and any reduction in the various image data around the overlapping areas also takes place.

The calculations which are carried out by means of the processing steps and/or evaluation steps are not subject to any limitation. They are to be designed in accordance with the application which is to be implemented by the image processing system.

For example, implementation of a side-view application with panoramic view requires the processing steps and/or evaluation steps to be based at least on a form for detecting image overlap. For example, in order to create applications such as those relating to lane detection, parking cameras and/or monitoring by the driver, the processing steps and/or evaluation steps need to be based at least on a form of image region analysis and/or image region detection.

In cases where the additional processing steps and/or evaluation steps carry out calculations which lead to a result, for example calculation of speed or distance from an object, according to the invention it is proposed that the results of the additional processing steps and/or evaluation steps can be shown on the image display unit.

Below, various embodiments of the method according to the invention, as well as an image processing system suitable for implementing the method according to the invention, are explained in an exemplary way with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
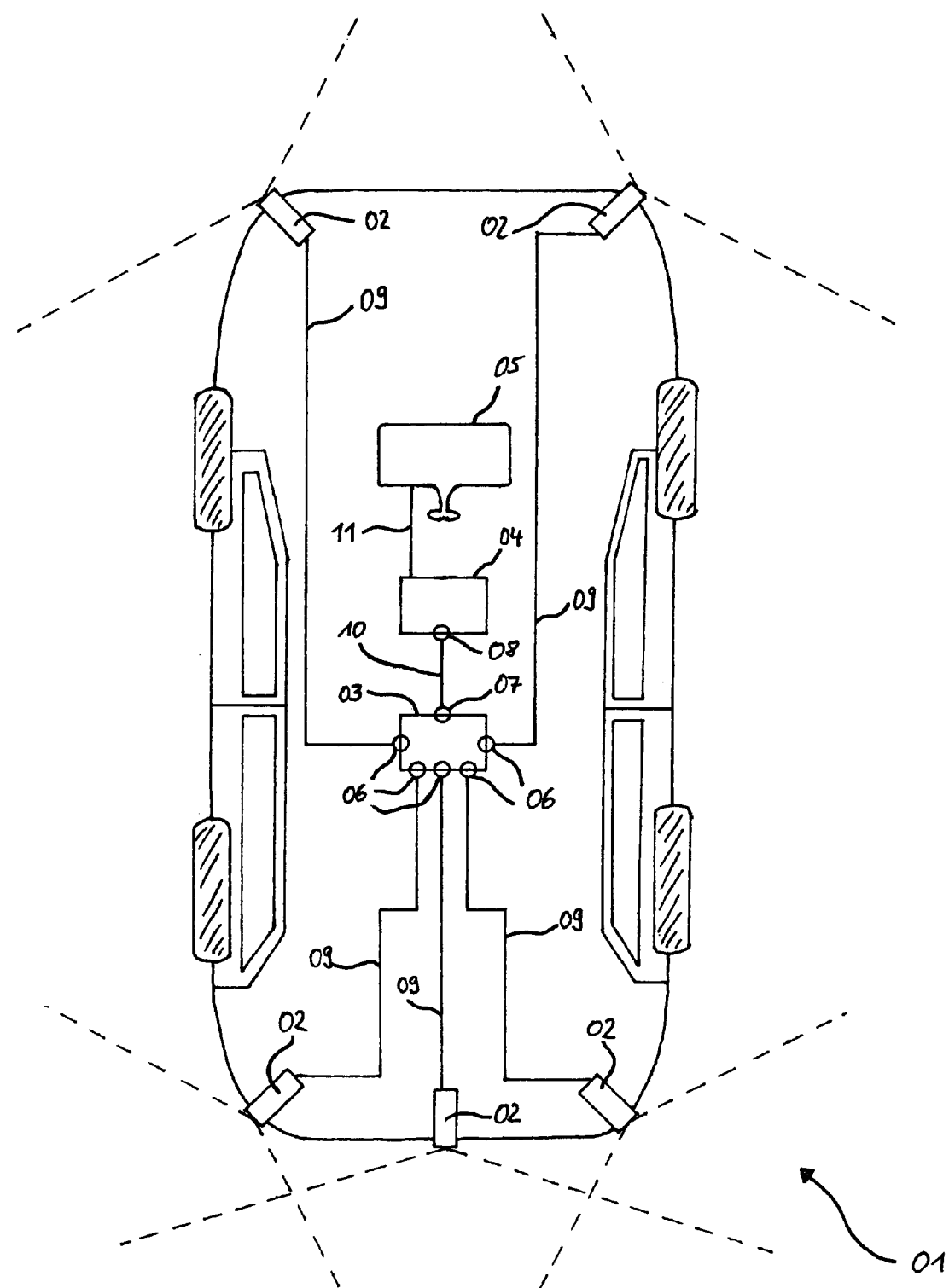
FIG. 1 is a schematic view of a first embodiment of an image processing system in a vehicle.

Referring to the drawings in particular, FIG. 1 shows a vehicle 01 comprising five image data sources 02, two of which are arranged in the front region of the vehicle 01, and three of which are arranged in the rear region of the vehicle 01. In this embodiment of the image processing system, the image data sources 02 are cameras, each of which monitors a different region. Furthermore, the vehicle 01 comprises a mixing unit 03, a conversion unit 04 as well as an image display unit 05. The mixing unit comprises five data input ports 06 and one data output port 07. The conversion unit comprises at least one data input port 08.

In each case the pixel data 09 generated by the image data sources 02 is conveyed to a data input port 06 of the mixing unit 03. In the mixing unit 03, the pixel data 09 of the various image data sources 02 is brought together and, if need be, additional processing steps and/or evaluation steps are carried out. The brought-together pixel data 10 is made available to the mixing unit 03 at the data output port 07, and is conveyed to the data input port 08 of the conversion unit 04. In the conversion unit 04, the brought-together pixel data 10 is transformed into a form of image data 11, which can be displayed on the image display unit 05.

Figure 2:
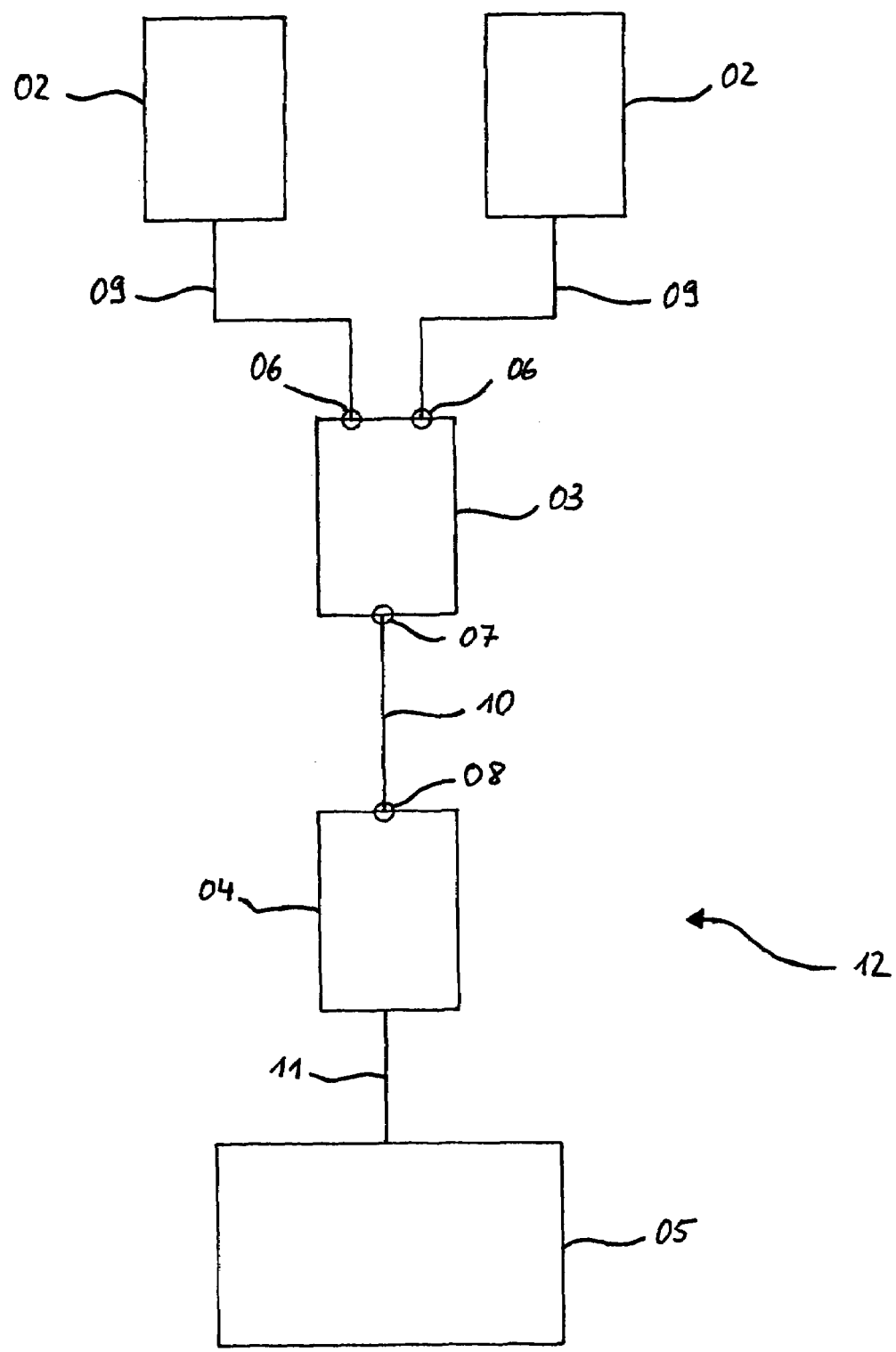
FIG. 2 is a functional diagram of a second embodiment of an image processing system.

FIG. 2 shows a second embodiment of an image processing system as a functional diagram. The image processing system 12 comprises two image data sources 02, a mixing unit 03 with two data input ports 06 and a data output port 07, as well as a conversion unit 04 with at least one data input port 08 and a display unit 05.

In each case the pixel data 09 of the various image data sources 02 is conveyed to a data input port 06 of the mixing device 03, is brought together in the mixing unit 03 in a first method-related step, and is made available, as brought-together pixel data 10, at the data output port 07 in the mixing unit 03. The brought-together pixel data 10 is conveyed from the data output port 07 of the mixing unit 03 to the data input port 08 of the conversion unit 04. In the conversion unit 04, the brought-together pixel data 10 is transformed into a form of image data 11, which can be displayed on the image display unit 05, and is then conveyed to the image display unit 05.

Figure 3:
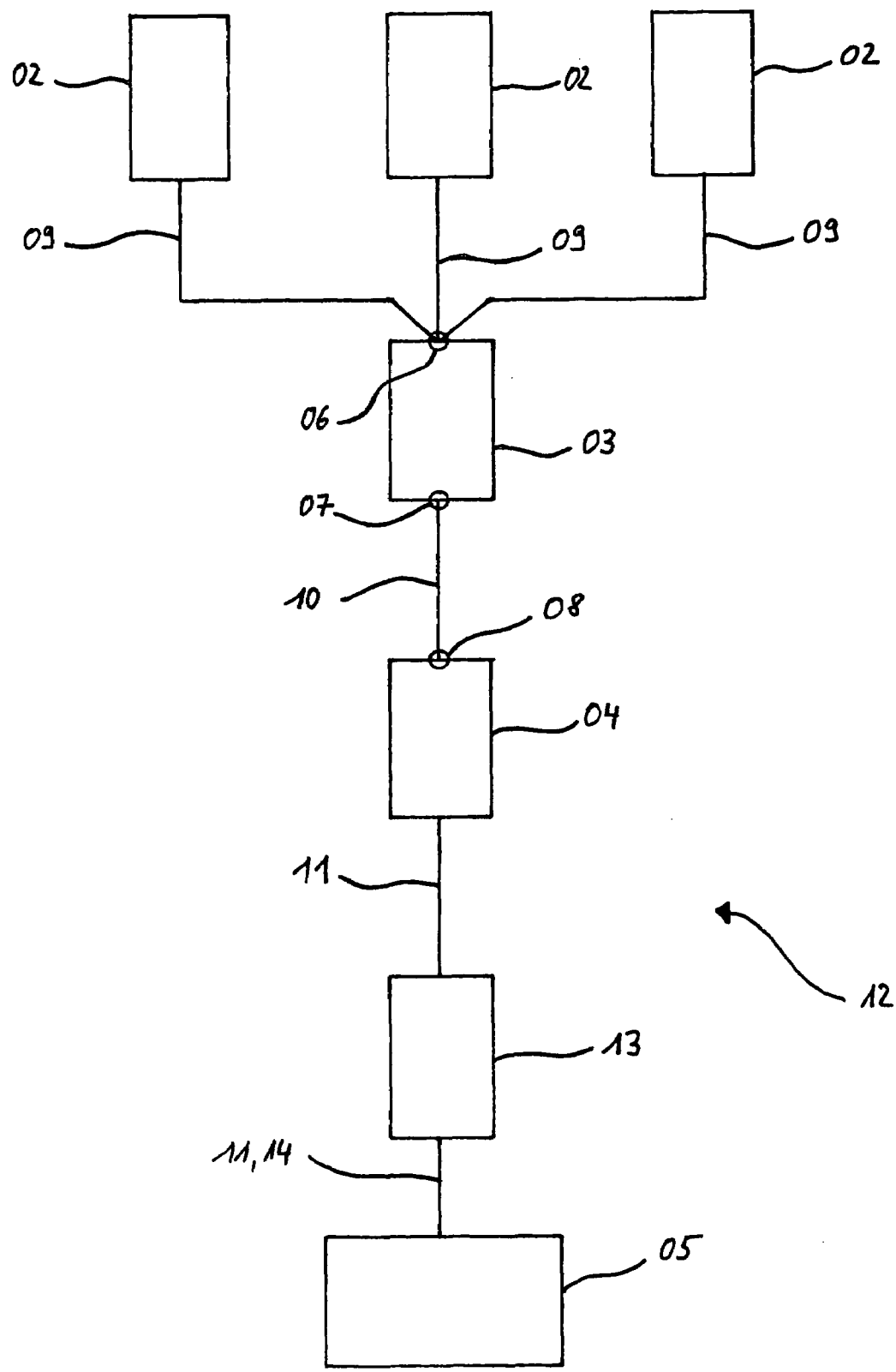
FIG. 3 is a functional diagram of a third embodiment of an image processing system.

FIG. 3 is a functional diagram of a third embodiment of an image processing system. The image processing system 12 comprises three image data sources 02, a mixing unit 03 with only one data input port 06, and a data output port 07, as well as a conversion unit 04 with at least one data input port 08, a third arithmetic unit 13 and an image disp unit 05.

The pixel data 09 of the various image data sources 02 is conveyed to the common input port 06 of the mixing unit 03. The brought-together pixel data 10 is made available at the data output port 07 of the mixing unit 03, and said data is conveyed to the data input port 08 of the conversion unit 04.

At the conversion unit 04, the brought-together pixel data 10 is transformed into a form of image data 11 which can be displayed on the image display unit 05, before being conveyed to the third arithmetic unit 13. The third arithmetic unit 13 can carry out calculations and/or additional processing steps and/or evaluation steps. The image data 11 and if applicable the result of the calculations and/or of the additional processing steps and/or of the evaluation steps is/are conveyed to the image display unit 05.

Figure 4:
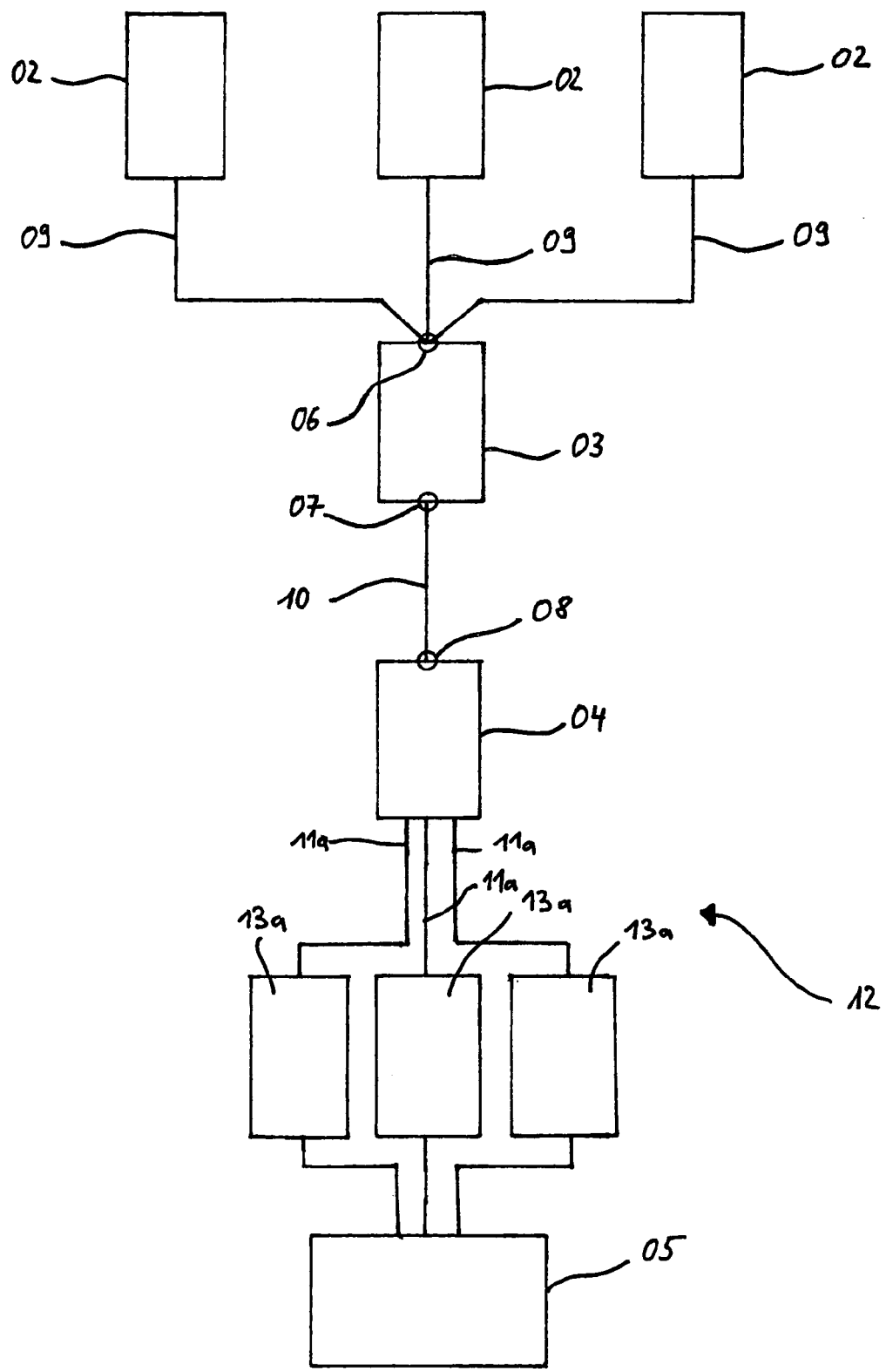
FIG. 4 is a functional diagram of a fourth embodiment of an image processing system.

FIG. 4 shows a fourth embodiment of an image processing system the design of which essentially corresponds to the third embodiment. The difference is that the fourth embodiment is provided with several third arithmetic units 13a which can be operated in parallel and in which various image processing functions can be carried out independently of one another.

Figure 5:
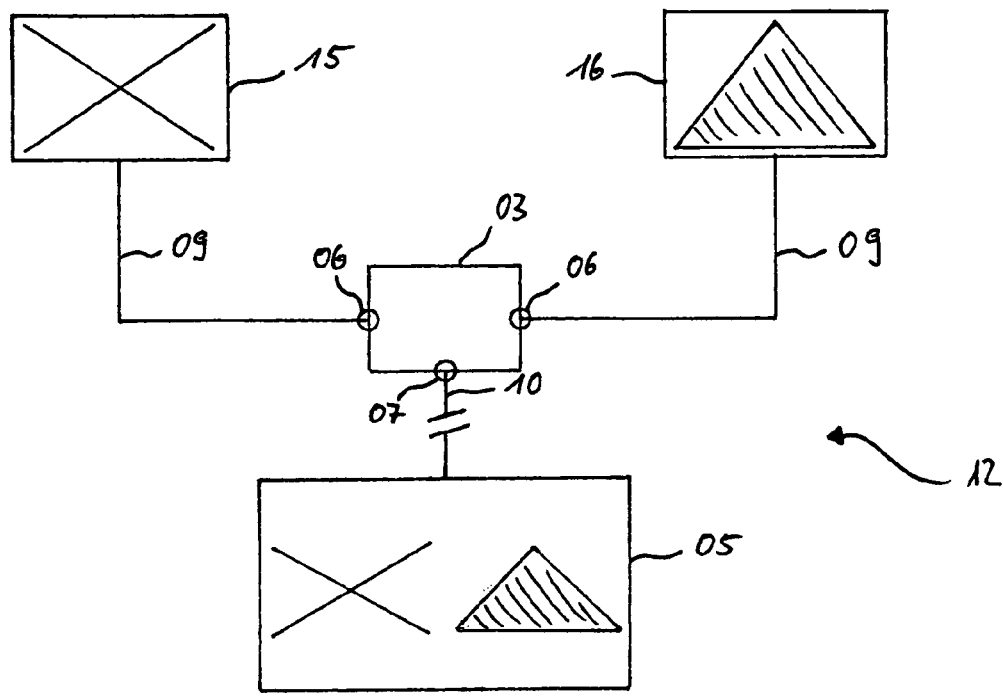
FIG. 5 is a functional diagram of a first embodiment of bringing the data together by means of the mixing unit.

FIG. 5 is a functional diagram of a first embodiment of the bringing together of pixel data of the various image data sources. The image processing system 12 comprises a first image data source 15 and a second image data source 16, wherein the two image data sources capture different information. Furthermore, the image processing system 12 comprises a mixing unit 03 with two data input ports 06 and a data output port 07 as well as an image display unit 05.

The pixel data 09 of the various image data sources 15, 16 is conveyed to the data input ports 06 of the mixing unit 03. In the mixing unit 03, the bringing-together of the pixel data 09 of the various image data sources 15, 16 is carried out in such a way that at the output port 07 of the mixing unit 03 an overall image in the form of brought-together pixel data 10 is output, wherein the overall image contains the entire image information of the first image data source 15 and of the second image data source 16 as a unified quantity.

Figure 6:
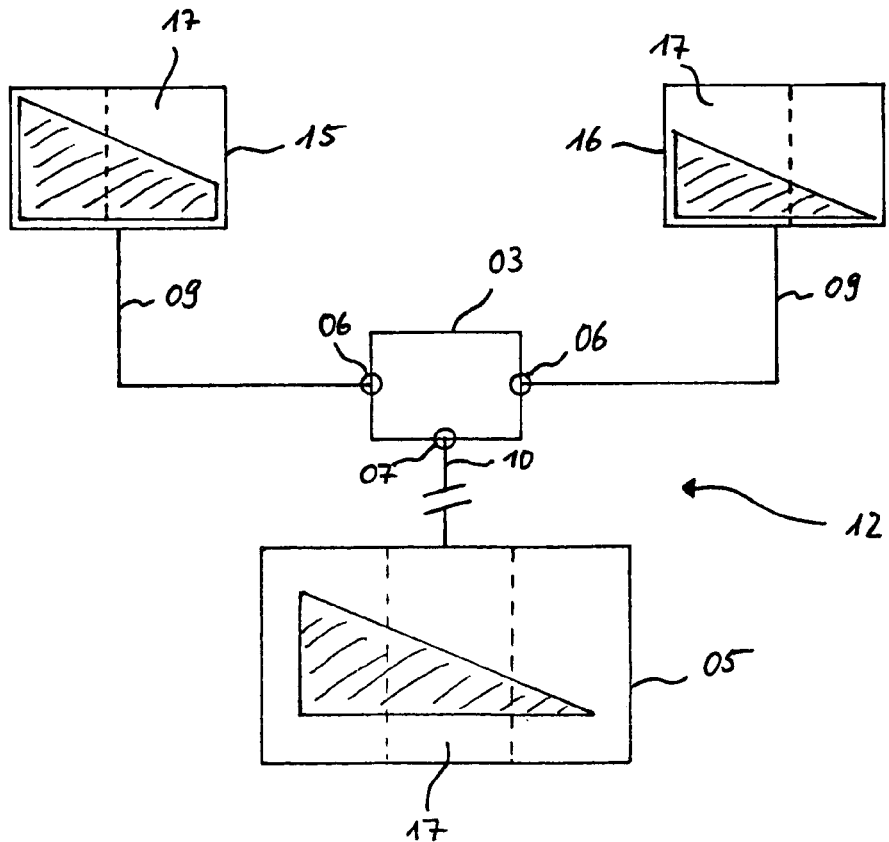
FIG. 6 is a functional diagram of a second embodiment of bringing the data together by means of the mixing unit.
Figure 7:
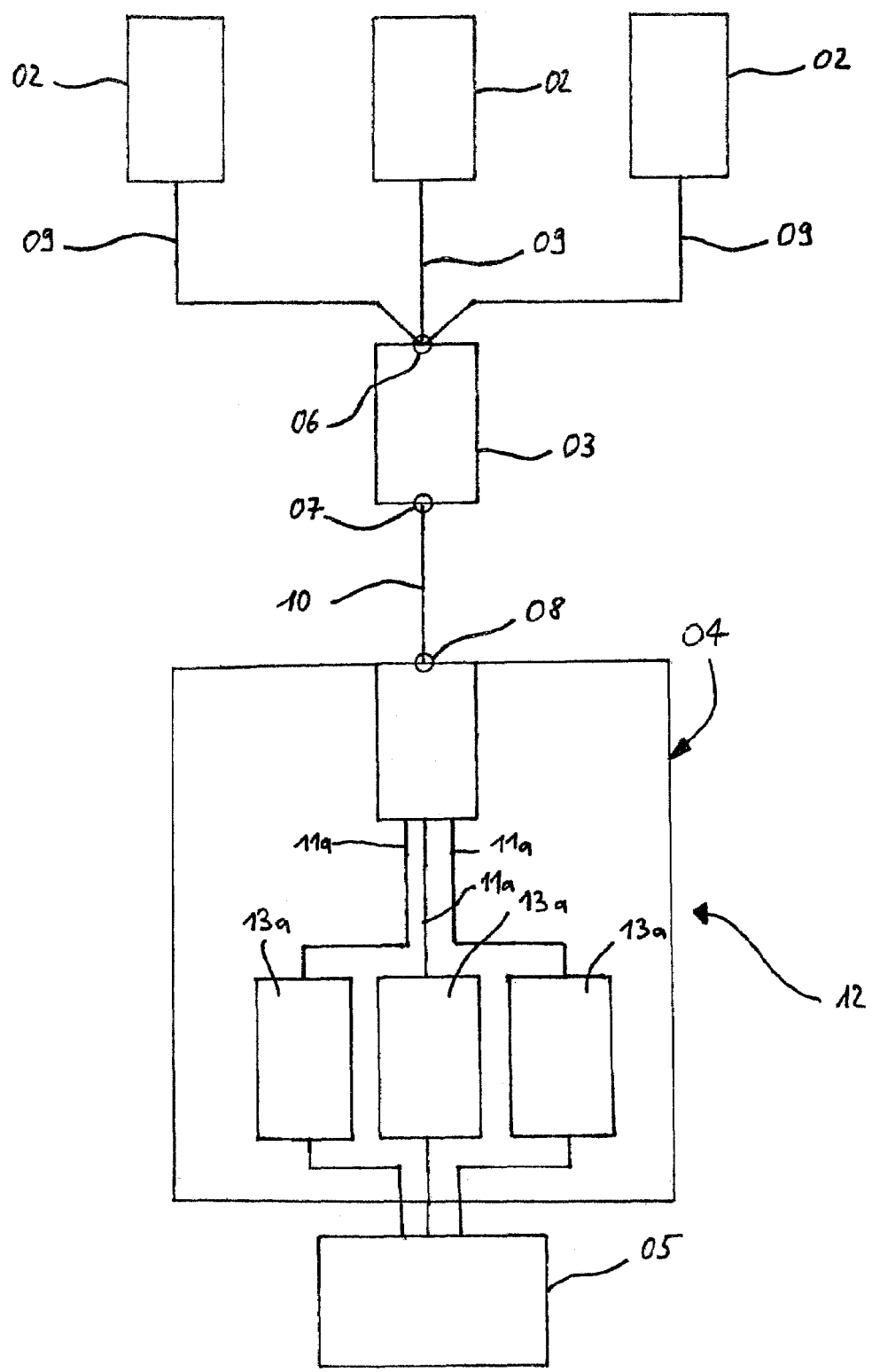
FIG. 7 is a functional diagram of an embodiment of an image processing system similar to the fourth embodiment but with the third arithmetic unit integrated in the conversion unit.

FIG. 6 is a functional diagram of a second embodiment of the bringing together of the pixel data of the various image data sources. The image processing system 12 comprises a first image data source 15 and a second image data source 16, wherein the two image data sources 15, 16 in an overlapping region 17 capture the same image information. Furthermore, the image processing system 12 comprises a mixing unit 03 with two data input ports 06 and a data output port 07 as well as an image display unit 05.

The image data 09 of the first image data source 15 and of the second image data source 16 is conveyed to the data input ports 06 of the mixing unit 03. In the mixing unit 03, the bringing-together of the pixel data 09 of the various image data sources 15, 16 is carried out such that at the data output port 07 in the mixing unit 03 an overall image in the form of brought-together pixel data 10 is output, wherein the overall image has been composed in a matching way from the images of the first image data source 15 and the second image data source 16.

While specific embodiments of the invention have been shown and described in detail to illustrate the application of the principles of the invention, it will be understood that the invention may be embodied otherwise without departing from such principles.

What is claimed is:

1. A vehicle comprising:
   two image data sources;
   a mixing unit;
   a conversion unit;
   a plurality of arithmetic units of identical design;
   an image display unit, wherein an image processing chain is provided in which pixel data with digital addressing generated with the image data sources can be brought together by means of the mixing unit for simultaneous display on the image display unit and wherein, by means of the conversion unit, the pixel data can be transformed to a form of image data which can be displayed on the image display unit, said mixing unit comprising two data input ports for receiving pixel data from the two image data sources and a data output port for the brought together pixel data, wherein the conversion unit comprises a data input port for the brought-together pixel data, and wherein the data output port of the mixing unit is directly or indirectly connected to the data input port of the conversion unit and wherein the plurality of arithmetic units are provided in the digital data processing chain and carry out individual functions in parallel, independently of one another, for at least one of image region analysis, object detection analysis and image overlap detection.

2. The vehicle according to claim 1, wherein the image data sources comprise at least one CCD unit and/or one CMOS unit.

3. The vehicle according to claim 1, wherein the mixing unit comprises at least one data input port, wherein the pixel data generated with the image data sources can directly or indirectly be forwarded to the data input port of the mixing unit.

4. The vehicle according to claim 1, wherein the mixing unit comprises an integrated circuit in the form of one of a DSP and/or an FPGA and/or an ASIC.

5. The vehicle according to claim 1, wherein the conversion unit is designed in the form of an integrated circuit, comprising one of a DSP and/or an FPGA and/or an ASIC.

6. The vehicle according to claim 1, wherein at least one of the plurality of arithmetic units is integrated in the mixing unit and/or the conversion unit.

7. The vehicle according to claim 1, wherein the plurality of arithmetic units can exchange data lines.

8. The vehicle according to claim 1, wherein the image display unit comprises a flat-panel monitor and/or a display.

9. The vehicle according to claim 1, wherein the image display unit comprises a projector device.

10. A method for operating an image processing system in a vehicle, comprising at least two image data sources including a CCD unit and/or CMOS unit, an image display unit and a digital processing chain including at least one mixing unit and at least one conversion unit, the method comprising:
   bringing the pixel data of the various image data sources together by means of the mixing unit whereby the overall quantity of the pixel data generated by the various image data sources is reducible to that part which is to be displayed on the image display unit; and
   subsequent to said step of bringing the pixel data of the various image data sources together, transforming the brought together pixel data by means of the conversion unit into a form of image data whereby the transformation of the pixel data into a form of image data is based on averaging by way of adjacent pixel data or interpolation, and plural arithmetic units carry out additional processing steps including one of image region analysis, object detection analysis and image overlap detection.

11. The method according to claim 10, wherein the pixel data of the various image data sources is subjected to additional processing steps and/or evaluation steps before the pixel data reaches the mixing unit.

12. The method according to claim 10, wherein the pixel data which has already been brought together by means of the mixing unit is subjected to additional processing steps and/or evaluation steps before the pixel data reaches the conversion unit.

13. The method according to claim 10, wherein the image data which has already been transformed by means of the conversion unit is subjected to additional processing steps and/or evaluation steps.

14. The method according to claim 10, wherein the additional processing steps can be implemented by means of the mixing unit and/or by means of the conversion unit.

15. The method according to claim 10, wherein the results of the additional processing steps can be shown on the image display unit.

16. The method according to claim 10, wherein the plurality of arithmetic units are provided with an identical design in the digital data processing chain and carry out individual functions in parallel, independently of one another, for at least one of image region analysis, object detection analysis and image overlap detection.

* * * * *